US010005940B2

(12) United States Patent
Itano et al.

(10) Patent No.: US 10,005,940 B2
(45) Date of Patent: Jun. 26, 2018

(54) COMPOSITION CONTAINING MIXTURE OF FLUORINATED HYDROCARBONS, AND METHOD FOR PRODUCING SAME

(71) Applicant: DAIKIN INDUSTRIES, LTD., Osaka (JP)

(72) Inventors: Mitsushi Itano, Osaka (JP); Hitomi Kuroki, Osaka (JP); Tatsumi Tsuchiya, Osaka (JP); Yasufu Yamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days. days.

(21) Appl. No.: 15/405,427

(22) Filed: Jan. 13, 2017

(65) Prior Publication Data
US 2017/0174967 A1 Jun. 22, 2017

Related U.S. Application Data

(63) Continuation-in-part of application No. PCT/JP2016/051888, filed on Jan. 22, 2016.

(30) Foreign Application Priority Data

Feb. 19, 2015 (JP) .................................. 2015-030991

(51) Int. Cl.
| C09K 5/04 | (2006.01) |
| C10M 107/34 | (2006.01) |
| C10M 105/38 | (2006.01) |
| C10M 107/24 | (2006.01) |
| C10M 171/00 | (2006.01) |
| F25B 31/00 | (2006.01) |

(52) U.S. Cl.
CPC ............. C09K 5/045 (2013.01); C09K 5/044 (2013.01); C10M 105/38 (2013.01); C10M 107/24 (2013.01); C10M 107/34 (2013.01); C10M 171/008 (2013.01); F25B 31/002 (2013.01); C09K 2205/122 (2013.01); C09K 2205/126 (2013.01); C09K 2205/22 (2013.01); C09K 2205/40 (2013.01); C10M 2207/2835 (2013.01); C10M 2209/043 (2013.01); C10M 2209/1033 (2013.01); C10N 2220/302 (2013.01); C10N 2240/30 (2013.01)

(58) Field of Classification Search
CPC ...... C09K 5/045; C09K 5/044; C10M 107/34; C10M 105/38; C10M 107/24; C10M 171/008; F25B 31/002
USPC ................. 252/67, 68, 69; 62/529
See application file for complete search history.

(56) References Cited

U.S. PATENT DOCUMENTS

| 6,018,952 A * | 2/2000 | Ide ........................ C09K 5/045 62/114 |
| 8,168,077 B2 | 5/2012 | Spatz |
| 2008/0230739 A1 | 9/2008 | Caron et al. |
| 2011/0186772 A1 | 8/2011 | Rached |
| 2016/0025394 A1 | 1/2016 | Rached |
| 2016/0369144 A1 * | 12/2016 | Tsuchiya ................ C09K 5/045 |
| 2017/0145276 A1 | 5/2017 | Rached |
| 2017/0174967 A1 | 6/2017 | Itano et al. |

FOREIGN PATENT DOCUMENTS

| EP | 0 509 673 | 10/1992 |
| EP | 0 811 670 | 12/1997 |
| JP | 5-17753 | 1/1993 |
| JP | 5-239450 | 9/1993 |
| JP | 8-48971 | 2/1996 |
| JP | 2869038 | 3/1999 |
| JP | 2009-511697 | 3/2009 |
| JP | 2012-82430 | 4/2012 |
| JP | 2013-515127 | 5/2013 |
| JP | 2014-141681 | 8/2014 |

(Continued)

OTHER PUBLICATIONS

Wikipedia, List of Refrigerants, 2017, pp. 1-17.*

(Continued)

Primary Examiner — Douglas J McGinty
(74) Attorney, Agent, or Firm — Wenderoth, Lind & Ponack, L.L.P.

(57) ABSTRACT

This invention provides, as alternative refrigerants for R404A, a refrigerant and refrigerant composition that have, for example, a nonflammability similar to that of R404A, a refrigerating capacity that can replace that of R404A, a ratio of refrigerating capacity to power consumed in a refrigeration cycle (coefficient of performance (COP)) that is equal or superior to that of R404A, and a lower GWP than that of R404A. More specifically, this invention provides a composition comprising a mixture containing fluorinated hydrocarbons, the mixture comprising difluoromethane (R32), pentafluoroethane (R125), and 1,1,1,2-tetrafluoroethane (R134a) in amounts such that the sum of the concentrations thereof is 99.5 wt % or more, the composition ratio of the fluorinated hydrocarbons contained in the mixture falling within a triangle having the following three points as vertices in a ternary composition diagram in which the sum of the concentrations of R32, R125, and R134a is 100 wt %:

point A (R32/R125/R134a=37.3/17.0/45.7 wt %),
point F (R32/R125/R134a=30.7/10.9/58.4 wt %), and
point G (R32/R125/R134a=29.4/14.1/56.5 wt %),
the mixture being an alternative refrigerant for R404A that is a mixed refrigerant.

17 Claims, 4 Drawing Sheets

(56) References Cited

FOREIGN PATENT DOCUMENTS

| | | |
|---|---|---|
| JP | 6020749 | 11/2016 |
| WO | 00/56834 | 9/2000 |
| WO | 2011/077088 | 6/2011 |

OTHER PUBLICATIONS

International Search Report dated Apr. 26, 2016 in International (PCT) Application No. PCT/JP2016/051888.
Extended European Application dated Apr. 9, 2018 in European Application No. 16752207.7.

* cited by examiner

COMPOSITION CONTAINING MIXTURE OF FLUORINATED HYDROCARBONS, AND METHOD FOR PRODUCING SAME

TECHNICAL FIELD

The present invention relates to a composition comprising a mixture containing fluorinated hydrocarbons that are used as, for example, a refrigerant, a method for producing the composition, and the like. The present invention also includes a case in which the composition consists of the three basic components contained in the mixture, i.e., difluoromethane (R32), pentafluoroethane (R125), and 1,1,1,2-tetrafluoroethane (R134a).

BACKGROUND ART

Refrigerants recently used, for example, for air conditioners, refrigerating devices, and refrigerators are mixtures of fluorinated hydrocarbons that contain no chlorine in their molecular structures, such as difluoromethane ($CH_2F_2$, R32, boiling point: $-52°$ C.), pentafluoroethane ($CF_3CHF_2$, R125, boiling point: $-48°$ C.), 1,1,1-trifluoroethane ($CF_3CH_3$, R143a, boiling point: $-47°$ C.), 1,1,1,2-tetrafluoroethane ($CF_3CH_2F$, R134a, boiling point: $-26°$ C.), and 1,1-difluoroethane ($CHF_2CH_3$, R152a, boiling point: $-24°$ C.)

Among the above fluorinated hydrocarbons, a ternary mixed refrigerant of R32/R125/R134a in which the proportions thereof are 23/25/52 wt % (R407C), a ternary mixed refrigerant of R125/143a/R134a in which the proportions thereof are 44/52/4 wt % (R404A), etc., have been proposed, and R404A is currently widely used as a refrigerant for freezing and refrigerated storage (for example, Patent Literature 1 and 2).

However, the global warming potential (GWP) of R404A is as high as 3922, which is equal to or higher than that of $CHClF_2$ (R22), which is a chlorine-containing fluorinated hydrocarbon. There is thus a desire to develop, as alternative refrigerants for R404A, a refrigerant and refrigerant composition that have, for example, a non-flammability similar to that of R404A, a refrigerating capacity that can replace that of R404A, a ratio of refrigerating capacity to power consumed in a refrigeration cycle (coefficient of performance (COP)) that is equal or superior to that of R404A, and a lower GWP than that of R404A.

CITATION LIST

Patent Literature

PTL 1: JP2869038B
PTL 2: U.S. Pat. No. 8,168,077

SUMMARY OF INVENTION

Technical Problem

An object of the present invention is to provide, as alternative refrigerants for the R404A that is currently widely used, a refrigerant and refrigerant composition that have, for example, a non-flammability similar to that of R404A, a refrigerating capacity that can replace that of R404A, a COP equal or superior to that of R404A, and a lower GWP than that of R404A. The definition of non-flammability in the present specification conforms to U.S. ASHRAE Standard 34-2013.

Solution to Problem

The present inventors conducted extensive research to achieve the above object, and found that the above object can be achieved by a composition comprising a mixture containing fluorinated hydrocarbons, the composition ratio of the fluorinated hydrocarbons contained in the mixture falling within a triangle having the following three points as vertices in a ternary composition diagram (FIG. 1) in which the sum of the concentrations of difluoromethane (R32), pentafluoroethane (R125), and 1,1,1,2-tetrafluoroethane (R134a) is 100 wt %:
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %).

The present invention has been accomplished through further research based on the above findings.

Specifically, the present invention provides the following composition and the like.

Item 1. A composition comprising a mixture containing fluorinated hydrocarbons, the mixture comprising difluoromethane (R32), pentafluoroethane (R125), and 1,1,1,2-tetrafluoroethane (R134a) in amounts such that the sum of the concentrations thereof is 99.5 wt % or more, the composition ratio of the fluorinated hydrocarbons contained in the mixture falling within a triangle having the following three points as vertices in a ternary composition diagram in which the sum of the concentrations of R32, R125, and R134a is 100 wt %:
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %),
the mixture being an alternative refrigerant for R404A that is a mixed refrigerant.

Item 2. The composition comprising a mixture containing fluorinated hydrocarbons according to Item 1, wherein the composition ratio of the fluorinated hydrocarbons contained in the mixture falls within a quadrilateral having the following four points as vertices in a ternary composition diagram in which the sum of the concentrations of R32, R125, and R134a is 100 wt %:
point B (R32/R125/R134a=34.0/13.9/52.1 wt %),
point C (R32/R125/R134a=33.3/15.5/51.2 wt %),
point E (R32/R125/R134a=31.7/14.9/53.4 wt %), and
point D (R32/R125/R134a=32.7/12.8/54.5 wt %).

Item 3. The composition comprising a mixture containing fluorinated hydrocarbons according to Item 1, wherein the composition ratio of the fluorinated hydrocarbons contained in the mixture falls within a triangle having the following three points as vertices in a ternary composition diagram in which the sum of the concentrations of R32, R125, and R134a is 100 wt %:
point A' (R32/R125/R134a=35.5/16.3/48.2 wt %),
point F' (R32/R125/R134a=31.1/12.2/56.7 wt %), and
point G (R32/R125/R134a=29.4/14.1/56.5 wt %).

Item 4. The composition comprising a mixture containing fluorinated hydrocarbons according to Item 1, wherein the composition ratio of the fluorinated hydrocarbons contained in the mixture falls within a quadrilateral having the following four points as vertices in a ternary composition diagram in which the sum of the concentrations of R32, R125, and R134a is 100 wt %:
point B' (R32/R125/R134a=33.7/14.7/51.6 wt %),
point C (R32/R125/R134a=33.3/15.5/51.2 wt %),
point E (R32/R125/R134a=31.7/14.9/53.4 wt %), and
point D' (R32/R125/R134a=32.4/13.4/54.2 wt %).

Item 5. The composition comprising a mixture containing fluorinated hydrocarbons according to Item 1, wherein the composition ratio of the fluorinated hydrocarbons contained in the mixture falls within a triangle having the following three points as vertices in a ternary composition diagram in which the sum of the concentrations of R32, R125, and R134a is 100 wt %:
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %); and
wherein the composition ratio falls within the following ranges: R32=32.5 wt %±0.5 wt %, R125=15.0 wt %±0.5 wt %, and R134a=52.5 wt %±1.0 wt %.

Item 6. The composition according to Item 1, wherein the mixture further comprises at least one fluorinated hydrocarbon selected from the group consisting of HCFC-1122, HCFC-124, CFC-1113, and 3,3,3-trifluoropropyne.

Item 7. The composition according to Item 1, wherein the mixture further comprises at least one halogenated organic compound represented by formula (1): $C_mH_nX_p$, wherein each X independently represents a fluorine atom, a chlorine atom, or a bromine atom, m is 1 or 2, $2m+2 \geq n+p$, and $p \geq 1$.

Item 8. The composition according to Item 1, wherein the mixture further comprises at least one organic compound represented by formula (2): $C_mH_nX_p$, wherein each X independently represents an atom that is not a halogen atom, m is 1 or 2, $2m+2 \geq n+p$, and $p \geq 1$.

Item 9. The composition according to Item 1, wherein the mixture further comprises water.

Item 10. The composition according to Item 1, wherein the mixture consists of R32, R125, and R134a.

Item 11. The composition according to Item 1, wherein the mixture has a GWP of 1500 or less, and the refrigerating capacity of the mixture is 94% or more relative to the refrigerating capacity of R404A.

Item 12. The composition according to Item 1, comprising a refrigerant oil.

Item 13. The composition according to Item 12, wherein the refrigerant oil comprises at least one polymer selected from the group consisting of polyalkylene glycol (PAG), polyol ester (POE), and polyvinyl ether (PVE).

Item 14. The composition according to Item 1, comprising at least one substance selected from the group consisting of tracers, compatibilizers, ultraviolet fluorescent dyes, stabilizers, and polymerization inhibitors.

Item 15. The composition according to Item 1, which is used for at least one member selected from the group consisting of refrigerators, freezers, water coolers, ice machines, refrigerating showcases, freezing showcases, freezing and refrigerating units, refrigerating devices for freezing and refrigerating warehouses, chillers (chilling units), turbo refrigerators, and screw refrigerators.

Item 16. A refrigeration method comprising the step of operating a refrigeration cycle using the composition according to Item 1.

Item 17. A method for operating a refrigerating device, comprising operating a refrigeration cycle using the composition according to Item 1.

Item 18. A refrigerating device comprising the composition according to Item 1.

Item 19. A method for producing a composition, comprising the step of mixing difluoromethane (R32), pentafluoroethane (R125), and 1,1,1,2-tetrafluoroethane (R134a) such that the composition ratio thereof is adjusted to fall within a triangle having the following three points as vertices in a ternary composition diagram in which the sum of the concentrations of R32, R125, and R134a is 100 wt %:
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %),
the mixture obtained in the step comprising R32, R125, and R134a in amounts such that the sum of the concentrations thereof is 99.5 wt % or more, and the mixture obtained in the step being an alternative refrigerant for R404A that is a mixed refrigerant.

Advantageous Effects of Invention

The present invention makes it possible to obtain, as an alternative refrigerant for R404A, a composition comprising a mixture containing fluorinated hydrocarbons that has, for example, a non-flammability similar to that of R404A, a refrigerating capacity that can replace that of R404A, a COP equal or superior to that of R404A, and a lower GWP than that of R404A because the composition ratio of the mixture falls within a triangle having the following three points as vertices in a ternary composition diagram for R32, R125, and R134a indicated by the triangular coordinates of FIG. 1:
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %).

DESCRIPTION OF EMBODIMENTS

Figure 1:
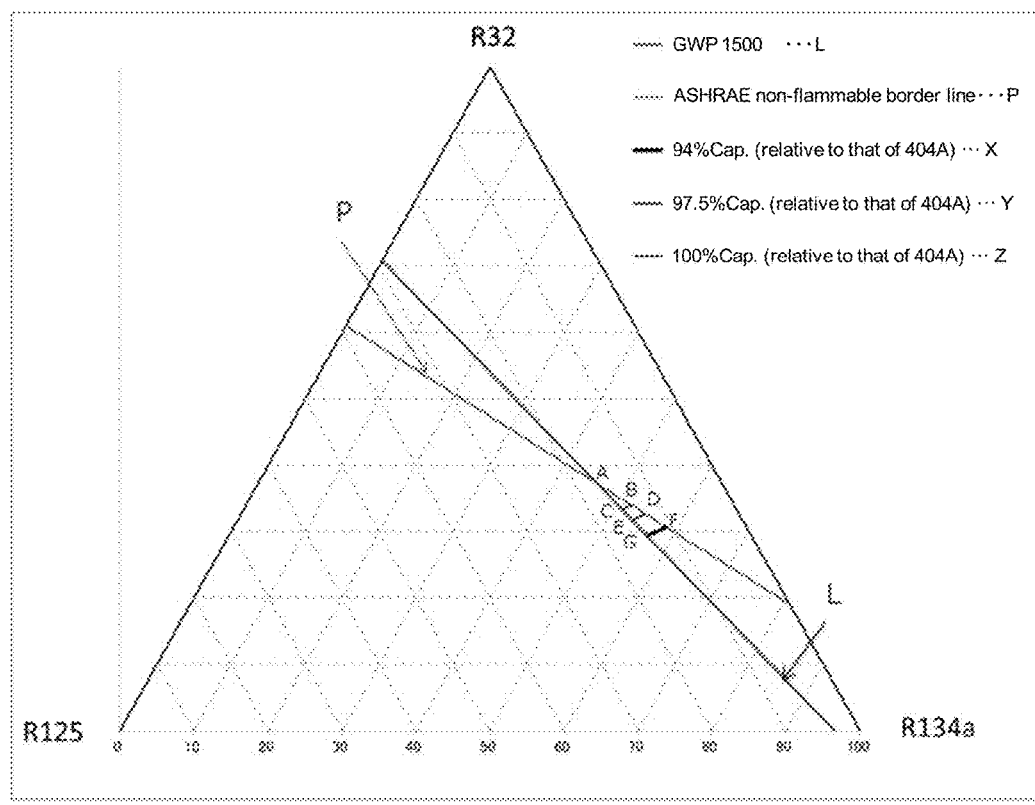
FIG. 1 illustrates a ternary composition diagram for R32, R125, and R134a in which the compositions of mixtures of the present invention (a triangle defined by points A, F, and G and a quadrilateral defined by points B, C, E, and D) are shown.

The composition of the present invention comprises a mixture containing fluorinated hydrocarbons, the mixture comprising difluoromethane (R32), pentafluoroethane (R125), and 1,1,1,2-tetrafluoroethane (R134a) in amounts such that the sum of the concentrations thereof is 99.5 wt % or more, the composition ratio of the fluorinated hydrocarbons contained in the mixture falling within a triangle having the following three points as vertices in a ternary composition diagram (FIG. 1) in which the sum of the concentrations of R32, R125, and R134a is 100 wt %:

point A (R32/R125/R134a=37.3/17.0/45.7 wt %),
point F (R32/R125/R134a=30.7/10.9/58.4 wt %), and
point G (R32/R125/R134a=29.4/14.1/56.5 wt %),
the mixture being an alternative refrigerant for R404A that is a mixed refrigerant.

The composition of the present invention has, for example, a non-flammability similar to that of R404A, a refrigerating capacity that can replace that of R404A, a COP equal or superior to that of R404A, and a lower GWP than that of R404A.

More specifically, since the composition of the present invention is non-flammable according to ASHRAE like R404A (details of the definition, etc., are described later), it is safer than flammable refrigerants and can be used in a wide range of applications.

The refrigerating capacity of the composition of the present invention can replace that of R404A. More specifically, the refrigerating capacity of the composition of the present invention is preferably 94% or more, more preferably 97.5% or more, and even more preferably 100% or more, relative to that of R404A.

The COP of the composition of the present invention is equal or superior to that of R404A (100% or more). The COP of the composition of the present invention is more preferably 105 or more, and even more preferably 110 or more, relative to that of R404A.

Moreover, the composition of the present invention has a GWP of 1500 or less, and thus can notably reduce a burden on the environment from a global warming perspective compared with other general-purpose refrigerants.

R404A is a refrigerant currently widely used for freezing and refrigerated storage, and the composition of the present invention can be an alternative refrigerant for R404A.

In the composition of the present invention, the mixture described above may consist of three basic components, i.e., difluoromethane (R32), pentafluoroethane (R125), and 1,1,1,2-tetrafluoroethane (R134a), or may comprise one or more components that are different from the three basic components (referred to as "other components") in addition to the three basic components. Hereinafter, difluoromethane (R32), pentafluoroethane (R125), and 1,1,1,2-tetrafluoroethane (R134a) are referred to as "three basic components" and one or more components that are different from the three basic components are referred to as "other components." Other components are described in detail later. The composition of the present invention may consist of the mixture, or may comprise any additives described later, such as a refrigerant oil, in addition to the mixture.

When the mixture contains other components, the mixture preferably contains other components in amounts such that the functions of the three basic components are not impaired. From this viewpoint, the content of other components in the mixture is preferably 0.5 wt % or less, more preferably 0.3 wt % or less, and even more preferably 0.1 wt % or less.

Mixture Containing Fluorinated Hydrocarbons

The composition according to an example of an embodiment of the present invention (Embodiment 1) comprises a mixture containing fluorinated hydrocarbons, the mixture comprising difluoromethane (R32), pentafluoroethane (R125), and 1,1,1,2-tetrafluoroethane (R134a) in amounts such that the sum of the concentrations thereof is 99.5 wt % or more, the composition ratio of the fluorinated hydrocarbons contained in the mixture falling within a triangle having the following three points as vertices in a ternary composition diagram (FIG. 1) in which the sum of the concentrations of R32, R125, and R134a is 100 wt %:
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %),
the mixture being an alternative refrigerant for R404A that is a mixed refrigerant.

As is described in detail below, in FIG. 1, a straight line passing through two points, i.e., point A and point F, shows an ASHRAE non-flammable border line; a straight line passing through two points, i.e., point A and point G, shows a line indicating a composition ratio at which the GWP is 1500; and a straight line passing through two points, i.e., point F and point G, shows a line indicating a composition ratio at which the refrigerating capacity is 94% relative to that of R404A.

In view of improving the refrigerating capacity, preferred embodiments are, for example, the following Embodiments 2 to 4, in each of which the range of the triangle or quadrilateral is smaller than the range of the triangle of Embodiment 1.

In Embodiment 2, the composition ratio of the fluorinated hydrocarbons contained in the mixture falls within a quadrilateral having the following four points as vertices in a ternary composition diagram (FIG. 1) in which the sum of the concentrations of R32, R125, and R134a is 100 wt %:
point B (R32/R125/R134a=34.0/13.9/52.1 wt %),
point C (R32/R125/R134a=33.3/15.5/51.2 wt %),
point E (R32/R125/R134a=31.7/14.9/53.4 wt %), and
point D (R32/R125/R134a=32.7/12.8/54.5 wt %).

In Embodiment 2, a straight line passing through two points, i.e., point D and point E, shows a line indicating a composition ratio in which the refrigerating capacity is 97.5% relative to that of R404A.

In Embodiment 3, the composition ratio of the fluorinated hydrocarbons contained in the mixture falls within a triangle having the following three points as vertices in a ternary composition diagram (FIG. 2) in which the sum of the concentrations of R32, R125, and R134a is 100 wt %:
point A' (R32/R125/R134a=35.5/16.3/48.2 wt %),
point F' (R32/R125/R134a=31.1/12.2/56.7 wt %), and
point G (R32/R125/R134a=29.4/14.1/56.5 wt %).

As is described in detail below, in FIG. 2, a straight line passing through two points, i.e., point A' and point F', shows an ASHRAE non-flammable border line when the allowable range is set to ±0.5% in the production of R32, R125, and R134a; a straight line passing through two points, i.e., point A' and point G, shows a line indicating a composition ratio at which the GWP is 1500; and a straight line passing through two points, i.e., point F' and point G, shows a line indicating a composition ratio at which the refrigerating capacity is 94% relative to that of R404A.

In view of improvement in the refrigerating capacity and the compressor outlet temperature, a preferred embodiment is, for example, the following Embodiment 4, in which the range of the quadrilateral is smaller than the range of the triangle of Embodiment 3.

In Embodiment 4, the composition ratio of the fluorinated hydrocarbons contained in the mixture falls within a quadrilateral having the following four points as vertices in a ternary composition diagram (FIG. 2) in which the sum of the concentrations of R32, R125, and R134a is 100 wt %:
point B' (R32/R125/R134a=33.7/14.7/51.6 wt %),
point C (R32/R125/R134a=33.3/15.5/51.2 wt %),
point E (R32/R125/R134a=31.7/14.9/53.4 wt %), and
point D' (R32/R125/R134a=32.4/13.4/54.2 wt %).

As is described in detail below, in FIG. 2, a straight line passing through two points, i.e., point B' and point F', shows an ASHRAE non-flammable border line when the allowable range is set to ±0.5% in the production of R32, R125, and R134a; a straight line passing through two points, i.e., point C and point E, shows a line indicating a composition ratio at which the GWP is 1500; a straight line passing through two points, i.e., point E and point D', shows a line indicating a composition ratio at which the refrigerating capacity is 97.5% relative to that of R404A; and a straight line passing through two points, i.e., point B' and point C, shows a line indicating a composition ratio at which the refrigerating capacity is 100% relative to that of R404A. From the viewpoint of the refrigerating capacity, the mixture in which the composition ratio falls within a triangle having, as vertices, the following three points is preferable: points A', B', and C; however, in the mixture in which the composition ratio falls within this range, the compressor outlet temperature may exceed 137.5° C. Thus, from the viewpoint of both the refrigerating capacity and the compressor outlet temperature, the mixture in which the composition ratio falls within a quadrilateral having, as vertices, the following four points is more preferable: points B', C, E, and D'. Such a mixture is also more preferable as a refrigerant mixture that is an alternative to R404A.

The technical meaning of each point in FIG. 1 is described in detail below.

In FIG. 1, when the wt % of R32=x, the wt % of R125=y, and the wt % of R134a=z, a line segment indicating an ASHRAE non-flammable border line is approximated by a line segment represented by the following equations.

ASHRAE non-flammable border line: a straight line passing through two points, i.e., point A and point F (line segment P of FIG. 1)

$$y=0.9286x-17.643$$

$$z=100-x-y$$

$$19 \leq x \leq 61$$

The ASHRAE flammability classification of refrigerants is now described.

The ASHRAE flammability classification of refrigerants is performed based on ANSI/ASHRAE Standard 34-2013. Refrigerants classified as Class 1 are non-flammable refrigerants. That is, the composition of the present invention being non-flammable according to ASHRAE means that the mixture containing fluorinated hydrocarbons used in the present invention (in particular, the three basic components) is classified as Class 1 in flammability classification.

More specifically, a leak test during storage, transportation, and use is performed based on ANSI/ASHRAE 34-2013 to specify the worst case of fractionation for flammability (WCFF). When the WCFF composition can be identified as being non-flammable in a test based on ASTM E681-09 (a standard test method for concentration limits of flammability of chemicals (vapors and gases)), it is classified as Class 1.

In FIG. 1, the R125 side from the line segment AF is classified as a mixed refrigerant that is non-flammable according to ASHRAE, whereas the R32 side from the line segment AF is classified as a mixed refrigerant that is flammable according to ASHRAE (Class 2: slightly flammable mixed refrigerants, Class 3: flammable mixed refrigerants).

However, in the production of a mixed refrigerant, an allowable range (including allowable error) is set for each refrigerant. Thus, even if the center composition of the mixed refrigerant is on the R125 side from the line segment AF of FIG. 1, when the allowable ranges are not all on the R125 side from the line segment AF, the mixed refrigerant is not defined as a mixed refrigerant that is non-flammable according to ASHRAE.

Figure 3:
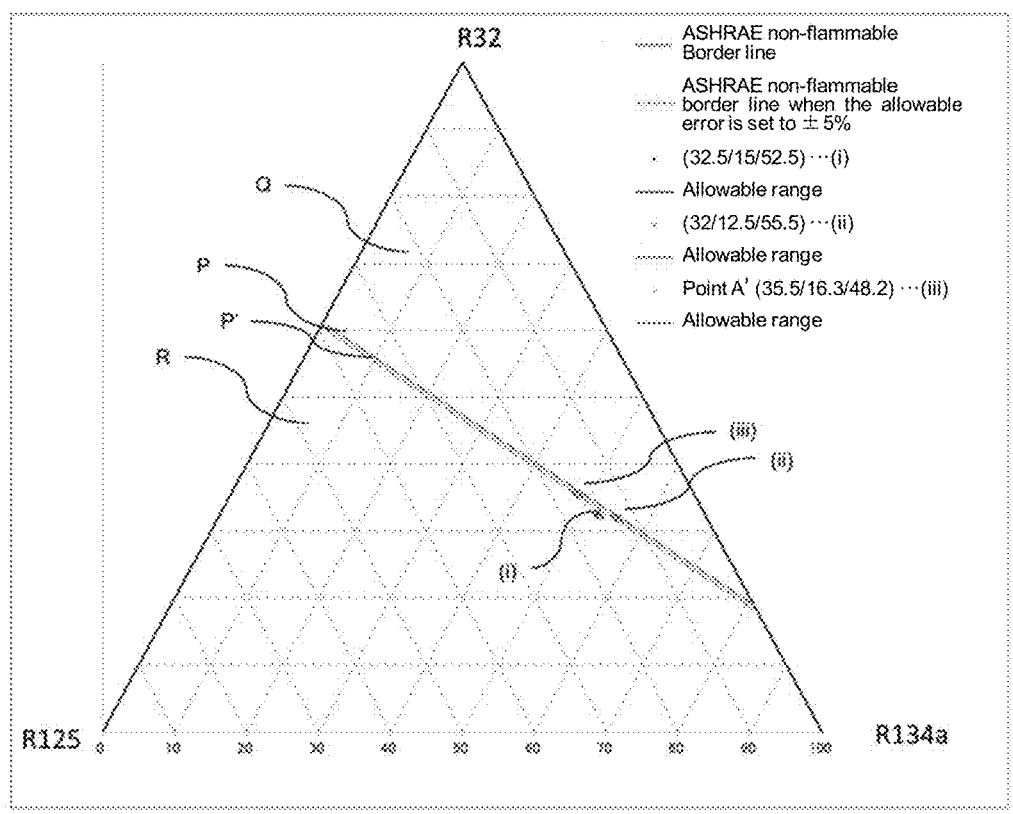
FIG. 3 illustrates a ternary composition diagram for R32, R125, and R134a in which P: ASHRAE non-flammable border line, P': ASHRAE non-flammable border line in which the allowable ranges are taken into consideration, Q: ASHRAE flammable region, and R: ASHRAE non-flammable region are shown. The diagram also shows the relationship between the allowable range (including allowable error) set for each refrigerant in the production of a mixed refrigerant and criteria for determining whether the mixed refrigerant is classified as a mixed refrigerant that is non-flammable according to ASHRAE or a mixed refrigerant that is flammable according to ASHRAE.
Figure 4:
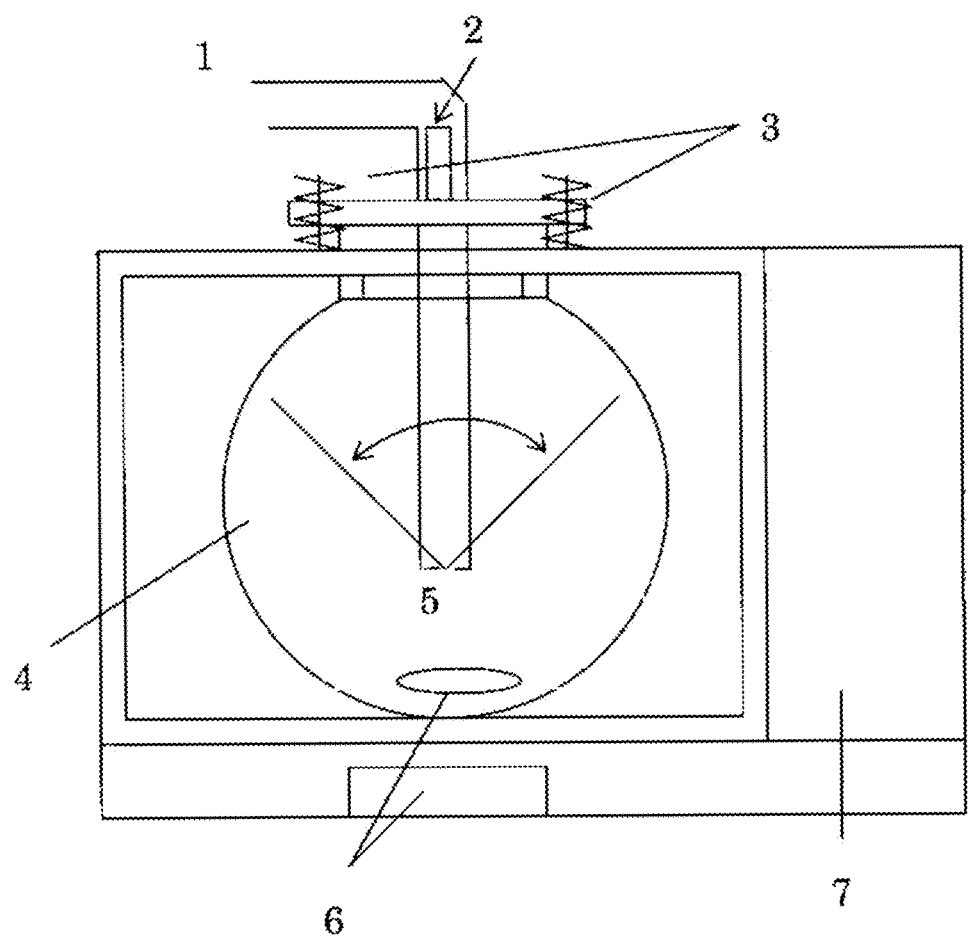
FIG. 4 illustrates a schematic view of an apparatus used in a flammability test.

For example, in the case where R32=32.5 wt %±0.5 wt %, R125=15.0 wt %±0.5 wt %, and R134a=52.5 wt %±1.0 wt %, all of the allowable ranges are on the R125 side from the line segment AF as shown in FIG. 3, and thus, the case is classified as a mixed refrigerant that is non-flammable according to ASHRAE. On the other hand, in the case where R32=32.0 wt %±0.5 wt %, R125=12.5 wt %±0.5 wt %, and R134a=55.5 wt %±1 wt %, the allowable ranges are partially on the R32 side from the line segment AF, and thus, a mixed refrigerant in which these allowable ranges are set is classified as a mixed refrigerant that is flammable according to ASHRAE.

When the allowable range of R32 is set to ±0.5 wt %, the allowable range of R125 is set to ±0.5 wt %, and the allowable range of R134a is set to ±1.0 wt %, a line in which the range in which all of the allowable ranges are on the R125 side from the line segment AF is taken into consideration is regarded as ASHRAE non-flammable border line in which the allowable ranges are taken into consideration, and is approximated by the following equations.

Figure 2:
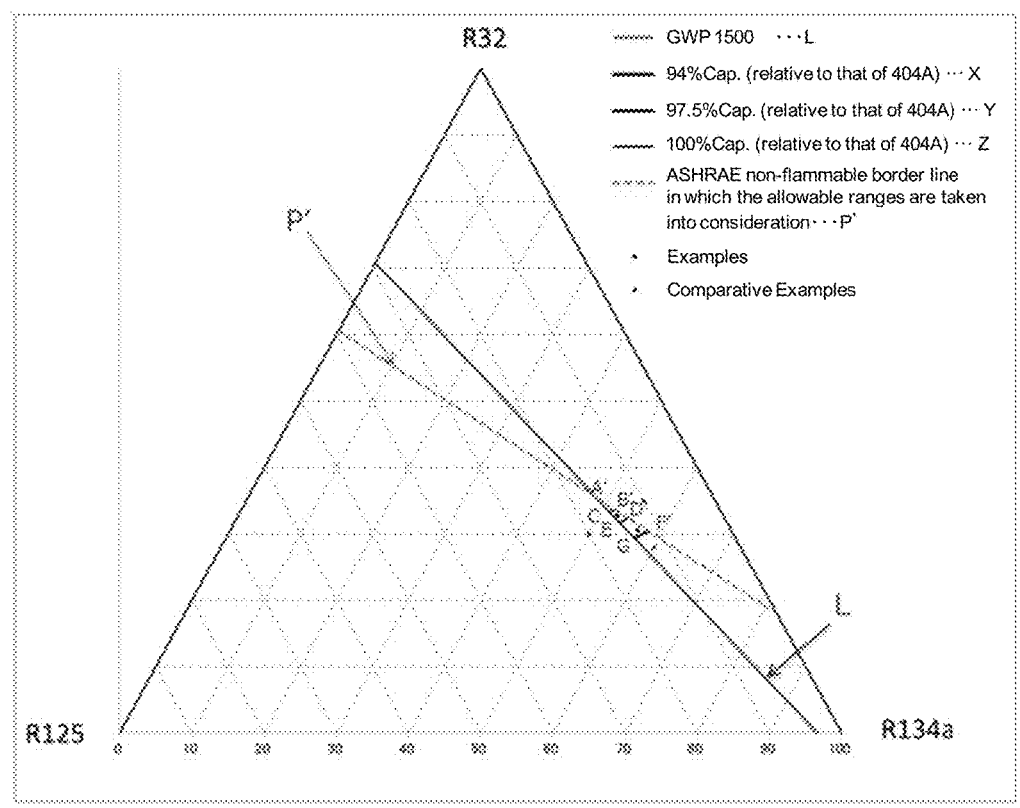
FIG. 2 illustrates a ternary composition diagram for R32, R125, and R134a in which the compositions of mixtures of the present invention (a triangle defined by points A', F', and G and a quadrilateral defined by points B', C, E, and D') are shown.

ASHRAE non-flammable border line in which the allowable ranges are taken into consideration: a straight line passing through two points, i.e., point A' and point F' (line segment P' of FIGS. 1, 2, and 3)

$$y=0.9286x-16.643$$

$$z=100-x-y$$

$$17.9 \leq x \leq 60.5$$

In FIG. 1, when the wt % of R32=x, the wt % of R125=y, and the wt % of R134a=z, a line segment indicating a composition ratio at which GWP=1500 is approximated by a line segment represented by the following equations.

Line segment indicating a composition ratio at which GWP=1500: a straight line passing through two points, i.e., point A and point G (line segment L of FIG. 1)

$$y=0.3644x+3.400$$

$$z=100-x-y$$

$$0 \leq x \leq 70.8$$

In addition, line segments indicating composition ratios at which the refrigerating capacity is 94%, 97.5%, and 100% relative to that of R404A are approximated by line segments represented by the following equations. Points of intersection with the ASHRAE non-flammable border line in which the allowable ranges are taken into consideration (y=0.9286x−16.643) are also described below.

Line segment indicating a composition ratio at which the refrigerating capacity is 94% relative to that of R404A: a straight line passing through two points, i.e., point F and point G (line segment X of FIG. 1)

$$y=-2.4615x+86.469$$

Point of intersection F' with the ASHRAE non-flammable border line in which the allowable ranges are taken into consideration=(30.4/11.6/58.0) (point F' of FIG. 2)

Line segment indicating a composition ratio at which the refrigerating capacity is 97.5% relative to that of R404A: a straight line passing through two points, i.e., point D and point E (line segment Y of FIG. 1)

$$y=-2.1x+81.47$$

Point of intersection D' with the ASHRAE non-flammable border line in which the allowable ranges are taken into consideration=(32.4/13.4/54.2) (point D' of FIG. 2)

Line segment indicating a composition ratio at which the refrigerating capacity is 100% relative to that of R404A: a straight line passing through two points, i.e., point B and point C (line segment Z of FIG. 1)

$$y=-2.2857x+91.614$$

Point of intersection B' with the ASHRAE non-flammable border line in which the allowable ranges are taken into consideration=(35.5/16.3/48.2) (point B' of FIG. 2)

The point of intersection A' of the ASHRAE non-flammable border line in which the allowable ranges are taken into consideration (y=0.9286x−16.643) and the line segment indicating a composition ratio at which the GWP is 1500 (y=0.3644x+3.400) is represented as (35.5/16.3/49.2) (A' of FIG. 2).

Components Other Than the Three Basic Components

The mixture contained in the composition of the present invention may further contain a tiny amount of water in addition to the three basic components (R32, R125, and R134a). The amount of water is preferably 0.1 parts by weight or less, per 100 parts by weight of the mixture. When the mixture contains a tiny amount of water, the double bonds in the molecules of unsaturated fluorinated hydrocarbons that may be contained in the composition can be stably present, and oxidation of unsaturated fluorinated hydrocarbons is less likely to occur, resulting in improved stability of the composition.

The mixture contained in the composition of the present invention may contain other component(s) (fluorinated hydrocarbon(s) that are different from the three basic components) in addition to the three basic components (R32, R125, and R134a). The fluorinated hydrocarbon(s) as other component(s) are not particularly limited, and, are, for example, at least one fluorinated hydrocarbon selected from the group consisting of HCFC-1122, HCFC-124, CFC-1113, and 3,3,3-trifluoropropyne.

The mixture contained in the composition of the present invention may contain, in addition to the three basic components (R32, R125, and R134a), at least one halogenated organic compound represented by formula (1): $C_mH_nX_p$, wherein each X independently represents a fluorine atom, a chlorine atom, or a bromine atom, m is 1 or 2, 2m+2≥n+p, and p≥1, as other component(s). The at least one halogenated organic compound as other component(s) is not particularly limited. Preferable examples include difluorochloromethane, chloromethane, 2-chloro-1,1,1,2,2-pentafluoroethane, 2-chloro-1,1,1,2-tetrafluoroethane, 2-chloro-1,1-difluoroethylene, trifluoroethylene, and the like.

The mixture contained in the composition of the present invention may contain, in addition to the three basic components (R32, R125, and R134a), at least one organic compound represented by formula (2): $C_mH_nX_p$, wherein each X independently represents an atom that is not a halogen atom, m is 1 or 2, 2m+2≥n+p, and p≥1, as other component(s). The at least one organic compound as other component(s) is not particularly limited. Preferable examples include propane, isobutane, and the like.

As described above, when the mixture contains other components, the content of other components in the mixture, whether other components are used singly or in a combination of two or more, is preferably 0.5 wt % or less, more preferably 0.3 wt % or less, and even more preferably 0.1 wt % or less, as the total content amount.

Optional Additives

The composition of the present invention may appropriately contain various additives in addition to the mixture.

The composition of the present invention may further contain a refrigerant oil. The refrigerant oil is not particularly limited and can be suitably selected from commonly used refrigerant oils. In this case, a refrigerant oil that is more excellent in terms of, for example, the effect of improving miscibility with the mixture, stability of the mixture, etc., may be appropriately selected, if necessary.

Although there is no particular limitation, the stability of the mixture can be evaluated by a commonly used method. Examples of such methods include an evaluation method using the amount of free fluorine ions as an index according to ASHRAE Standard 97-2007, and the like. There is, for example, another evaluation method using the total acid number as an index. This method can be performed, for example, according to ASTM D 974-06.

Preferred as the type of the refrigerant oil is, specifically, for example, at least one member selected from the group consisting of polyalkylene glycol (PAG), polyol ester (POE), and polyvinyl ether (PVE).

The refrigerant oil to be used may have, for example, a kinematic viscosity at 40° C. of 5 to 400 cSt. When the refrigerant oil has a kinematic viscosity within this range, it is preferable in teams of lubricity.

The concentration of the refrigerant oil is not particularly limited, and may be generally 10 to 50 wt %, relative to the entire composition.

The composition of the present invention may further contain one or more tracers. The one or more tracers are added to the composition of the present invention at a detectable concentration so that, when the composition of the present invention is diluted, contaminated, or undergoes any other change, the change can be traced. There is no limitation on the tracers. Preferable examples include hydrofluorocarbons, deuterated hydrocarbons, deuterated hydrofluorocarbons, perfluorocarbons, fluoroethers, brominated compounds, iodinated compounds, alcohols, aldehydes, ketones, nitrous oxide ($N_2O$), and the like. Particularly preferred are hydrofluorocarbons or fluoroethers.

The composition of the present invention may further contain a compatibilizer. The type of compatibilizer is not particularly limited. Preferable examples include polyoxyalkylene glycol ethers, amides, nitriles, ketones, chlorocarbons, esters, lactones, aryl ethers, fluoroethers, 1,1,1-trifluoroalkans, and the like. Particularly preferred are polyoxyalkylene glycol ethers.

The composition of the present invention may further contain one or more ultraviolet fluorescent dyes. There is no limitation on the ultraviolet fluorescent dyes. Preferable examples include naphthalimide, coumarin, anthracene, phenanthrene, xanthene, thioxanthene, naphthoxanthene, and fluorescein, and derivatives thereof. Either naphthalimide or coumarin, or both are particularly preferable.

The composition of the present invention may further contain a stabilizer, a polymerization inhibitor, etc., if necessary.

Examples of stabilizers include, but are not particularly limited to, (i) aliphatic nitro compounds, such as nitromethane and nitroethane; and aromatic nitro compounds, such as nitrobenzene and nitrostyrene; (ii) ethers, such as 1,4-dioxane; amines, such as 2,2,3,3,3-pentafluoropropylamine and diphenylamine; butylhydroxyxylene, benzotriazole, and the like. The stabilizers can be used singly or in a combination of two or more.

The concentration of the stabilizer varies depending on the type of stabilizer, but can be determined within a range in which the properties of the composition are not impaired. The concentration of the stabilizer is generally preferably about 0.01 to 5 parts by weight, and more preferably about 0.05 to 2 parts by weight, per 100 parts by weight of the mixture.

Examples of polymerization inhibitors include, but are not particularly limited to, 4-methoxy-1-naphthol, hydroquinone, hydroquinonemethyl ether, dimethyl-t-butylphenol, 2,6-di-tert-butyl-p-cresol, benzotriazole, and the like.

The concentration of the polymerization inhibitor is generally preferably 0.01 to 5 parts by weight, and more preferably about 0.05 to 2 parts by weight, per 100 parts by weight of the mixture.

In an example of an embodiment of the present invention, an object can be refrigerated by a method comprising the step of operating a refrigeration cycle using the composition of the present invention. For example, the composition of the present invention can be circulated via a compressor to form the refrigeration cycle.

It is also possible to produce an apparatus for forming a refrigeration cycle in which the composition of the present invention is circulated via a compressor.

Examples of refrigerating devices that can use the composition of the present invention include, but are not limited to, refrigerators, freezers, water coolers, ice machines, refrigerating showcases, freezing showcases, freezing and refrigerating units, refrigerating devices used, for example, for freezing and refrigerating warehouses, chillers (chilling units), turbo refrigerators, screw refrigerators, and the like.

Method for Producing Composition

The method for producing the composition of Embodiment 1 of the present invention comprises the step of mixing R32, R125, and R134a such that the composition ratio of the fluorinated hydrocarbons contained in the mixture is adjusted to fall within a triangle having the following three points as vertices in a ternary composition diagram (FIG. 1) in which the sum of the concentrations of R32, R125, and R134a is 100 wt %:
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %),
the mixture comprising difluoromethane (R32), pentafluoroethane (R125), and 1,1,1,2-tetrafluoroethane (R134a) in amounts such that the sum of the concentrations thereof is 99.5 wt % or more. The composition of Embodiment 1 can be produced by this production method.

The method for producing the composition of Embodiment 2 of the present invention comprises the step of mixing R32, R125, and R134a such that the composition ratio of the fluorinated hydrocarbons contained in the mixture is adjusted to fall within a quadrilateral having the following four points as vertices in a ternary composition diagram (FIG. 1) in which the sum of the concentrations of R32, R125, and R134a is 100 wt %:
point B (R32/R125/R134a=34.0/13.9/52.1 wt %),
point C (R32/R125/R134a=33.3/15.5/51.2 wt %),
point E (R32/R125/R134a=31.7/14.9/53.4 wt %), and
point D (R32/R125/R134a=32.7/12.8/54.5 wt %),
the mixture comprising difluoromethane (R32), pentafluoroethane (R125), and 1,1,1,2-tetrafluoroethane (R134a) in amounts such that the sum of the concentrations thereof is 99.5 wt % or more. The composition of Embodiment 2 can be produced by this production method.

The method for producing the composition of Embodiment 3 of the present invention comprises the step of mixing R32, R125, and R134a such that the composition ratio of the fluorinated hydrocarbons contained in the mixture is adjusted to fall within a triangle having the following three points as vertices in a ternary composition diagram (FIG. 2) in which the sum of the concentrations of R32, R125, and R134a is 100 wt %:
point A' (R32/R125/R134a=35.5/16.3/48.2 wt %),
point F' (R32/R125/R134a=31.1/12.2/56.7 wt %), and
point G (R32/R125/R134a=29.4/14.1/56.5 wt %),
the mixture comprising difluoromethane (R32), pentafluoroethane (R125), and 1,1,1,2-tetrafluoroethane (R134a) in amounts such that the sum of the concentrations thereof is 99.5 wt % or more. The composition of Embodiment 3 can be produced by this production method.

The method for producing the composition of Embodiment 4 of the present invention comprises the step of mixing R32, R125, and R134a such that the composition ratio of the fluorinated hydrocarbons contained in the mixture is adjusted to fall within a quadrilateral having the following four points as vertices in a ternary composition diagram (FIG. 2) in which the sum of the concentrations of R32, R125, and R134a is 100 wt %:
point B' (R32/R125/R134a=33.7/14.7/51.6 wt %),
point C (R32/R125/R134a=33.3/15.5/51.2 wt %),
point E (R32/R125/R134a=31.7/14.9/53.4 wt %), and
point D' (R32/R125/R134a=32.4/13.4/54.2 wt %),
the mixture comprising difluoromethane (R32), pentafluoroethane (R125), and 1,1,1,2-tetrafluoroethane (R134a) in amounts such that the sum of the concentrations thereof is 99.5 wt % or more. The composition of Embodiment 4 can be produced by this production method.

EXAMPLES

The present invention is described in detail below with reference to Examples. However, the present invention is not limited to the Examples.

Examples 1 to 13 and Comparative Examples 1 to 12

The GWP of each of R404A and mixed refrigerants of R32, R125, and R134a was evaluated based on the values described in the Intergovernmental Panel on Climate Change (IPCC) fourth report.

The COP and refrigerating capacity of each of R404A and the mixed refrigerants of R32, R125, and R134a were determined by performing refrigeration cycle theoretical calculations for the refrigerant and mixed refrigerants using the National Institute of Science and Technology (NIST) and Reference Fluid Thermodynamic and Transport Properties Database (Refprop 9.0) under the following conditions.
Evaporation temperature −40° C.
Condensation temperature 40° C.
Superheating temperature 20K
Supercooling temperature 0K
Compressor efficiency 70%

In FIG. 1, the proportions of the components of the compositions of the Examples are indicated by solid triangles (▲).

Tables 1 and 2 show the GWP, COP, and refrigerating capacity calculated based on these results. Regarding the COP and refrigerating capacity, the percentages relative to those of R404A are shown.

The coefficient of performance (COP) was calculated according to the following equation.

$$COP = (\text{refrigerating capacity or heating capacity}) / \text{amount of electrical power consumed}$$

The flammability of the mixture of the three basic components used in the composition was evaluated according to U.S. ASHRAE Standard 34-2013. The flammability test was conducted in accordance with ASTM E681-09. FIG. 2 shows a non-flammable border line (P), a flammable region (Q), and a non-flammable region (R).

A 12-L spherical glass flask was used so that the combustion state could be visually observed and photographically recorded. When excessive pressure was generated by combustion, gas was allowed to escape from the upper lid. Ignition was achieved by electric discharge from electrodes disposed at one-third the distance from the bottom.

Test Conditions

Test vessel: 280 mmφ spherical (internal volume: 12 liters)
Test temperature: 60° C.±3° C.
Pressure: 101.3 kPa±0.7 kPa
Water: 0.0088 g±0.0005 g per gram of dry air
Mixing ratio of composition/air: 1 vol. % increments±0.2 vol. %
Composition mixture: ±0.1 wt %
Ignition method: AC discharge, voltage: 15 kV, electric current: 30 mA, neon transformer
Electrode spacing: 6.4 mm (¼ inch)
Spark: 0.4 seconds±0.05 seconds
Evaluation criteria: When the flame propagation extends at an angle of more than 90° from the ignition point, it was evaluated as flammable.

The composition ratio of R32, R125, and R134a (x/y/z wt %) in the non-flammability limit almost satisfied the relationship represented by the following equations (1) to (3).

$$19 \leq x \leq 61 \quad (1)$$

$$y = 0.9286x - 17.643 \quad (2)$$

$$z = 100 - x - y \quad (3)$$

The results revealed that the composition of the present invention is non-flammable, and causes no combustion, even when mixed with air at any ratio.

TABLE 1

| Item | | Unit | R404A | Comparative Example 1 Point A | Example 1 Point B | Example 2 Point C | Example 3 Point D | Example 4 Point E | Example 5 Point F | Example 6 Point G |
|---|---|---|---|---|---|---|---|---|---|---|
| Composition | R32 | wt % | 0 | 37.3 | 34.0 | 33.3 | 32.7 | 31.7 | 30.7 | 29.4 |
| | R125 | wt % | 44.0 | 17.0 | 13.9 | 15.5 | 12.8 | 14.9 | 10.9 | 14.1 |
| | R134a | wt % | 4.0 | 45.7 | 52.1 | 51.2 | 54.5 | 53.4 | 58.4 | 56.5 |
| | R143a | wt % | 52.0 | 0 | 0 | 0 | 0 | 0 | 0 | 0 |
| GWP | | year | 3922 | 1500 | 1461 | 1499 | 1448 | 1499 | 1424 | 1500 |
| Coefficient of performance | | % (relative to that of R404A) | 100.0 | 111.3 | 111.9 | 111.7 | 112.1 | 111.8 | 112.4 | 112.0 |
| Refrigerating capacity | | % (relative to that of R404A) | 100.0 | 106.2 | 100.0 | 100.0 | 97.6 | 97.5 | 94.0 | 94.0 |
| Compressor outlet temperature | | ° C. | 92.6 | 139.9 | 137.7 | 136.7 | 136.7 | 135.4 | 135.3 | 133.4 |
| Condenser temperature glide | | ° C. | 0.3 | 4.7 | 5.0 | 5.0 | 5.1 | 5.1 | 5.2 | 5.2 |
| Evaporator temperature glide | | ° C. | 0.4 | 4.2 | 4.2 | 4.2 | 4.2 | 4.1 | 4.1 | 4.1 |
| Flammability | | — | non-flammable | non-flammable | non-flammable | non-flammable | non-flammable | non-flammable | non-flammable | non-flammable |

TABLE 2

| Item | | Unit | Example 7 Point A' | Example 8 Point B' | Example 9 Point D' | Example 10 Point G' | Example 11 Within □ B'CED | Example 12 Within Δ A'GF' | Comparative Example 2 | Comparative Example 3 | Comparative Example 4 |
|---|---|---|---|---|---|---|---|---|---|---|---|
| Composition | R32 | wt % | 35.5 | 33.7 | 32.4 | 30.4 | 32.5 | 30.5 | 30.0 | 35.0 | 28.0 |
| | R125 | wt % | 16.3 | 14.7 | 13.4 | 11.6 | 15.0 | 13.0 | 20.0 | 10.0 | 12.0 |
| | R134a | wt % | 48.2 | 51.6 | 54.2 | 58.0 | 52.5 | 56.5 | 50.0 | 55.0 | 60.0 |
| | R143a | wt % | 0 | 0 | 0 | 0 | 0 | 0 | 0 | 0 | 0 |
| GWP | | year | 1499 | 1480 | 1463 | 1441 | 1495 | 1469 | 1618 | 1373 | 1467 |
| Coefficient of performance | | % (relative to that of R404A) | 111.5 | 111.8 | 112.0 | 112.3 | 111.8 | 112.1 | 111.2 | 112.3 | 112.3 |
| Refrigerating capacity | | % (relative to that of R404A) | 103.4 | 100.0 | 97.6 | 94.0 | 98.7 | 94.9 | 98.2 | 99.0 | 91.1 |
| Compressor outlet temperature | | ° C. | 138.5 | 137.2 | 136.3 | 134.9 | 136.3 | 134.7 | 132.6 | 139.5 | 132.6 |
| Condenser temperature glide | | ° C. | 4.8 | 5.0 | 5.1 | 5.2 | 5.0 | 5.2 | 5.0 | 5.1 | 5.3 |
| Evaporator temperature glide | | ° C. | 4.2 | 4.2 | 4.2 | 4.1 | 4.2 | 4.1 | 4.1 | 4.2 | 4.0 |
| Flammability | | — | non-flammable | non-flammable | non-flammable | non-flammable | non-flammable | non-flammable | non-flammable | flammable | non-flammable |

In Comparative Example 1, the compressor outlet temperature was too high, i.e., about 140° C. In Comparative Example 2, the GWP exceeded 1500. The composition of Comparative Example 3 was flammable. In Comparative Example 4, the refrigerating capacity was as low as 91%.

DESCRIPTION OF REFERENCE NUMERALS

A: Composition ratio of Comparative Example 1
B: Composition ratio of Example 1
C: Composition ratio of Example 2
D: Composition ratio of Example 3
E: Composition ratio of Example 4
F: Composition ratio of Example 5
G: Composition ratio of Example 6
A': Composition ratio of Example 7
B': Composition ratio of Example 8
D': Composition ratio of Example 9
F': Composition ratio of Example 10
L: Approximation line segment of line segment indicating GWP=1500
X: Approximation line segment of line segment indicating a composition ratio at which the refrigerating capacity is 100% (relative to that of R404A)
Y: Approximation line segment of line segment indicating a composition ratio at which the refrigerating capacity is 97.5% (relative to that of R404A)
Z: Approximation line segment of line segment indicating a composition ratio at which the refrigerating capacity is 94% (relative to that of R404A)
P: ASHRAE non-flammable border line
P': ASHRAE non-flammable border line when the allowable range is set to ±0.5%
Q: ASHRAE flammable region
R: ASHRAE non-flammable region
1: Ignition source
2: Sample inlet
3: Springs
4: 12-liter glass flask
5: Electrodes
6: Stirrer
7: Insulated chamber

The invention claimed is:

1. A composition comprising a mixture containing fluorinated hydrocarbons, wherein the composition ratio of the fluorinated hydrocarbons contained in the mixture falls within a quadrilateral having the following four points as vertices in a ternary composition diagram in which the sum of the concentrations of R32, R125, and R134a is 100 wt %:
point B (R32/R125/R134a=34.0/13.9/52.1 wt %),
point C (R32/R125/R134a=33.3/15.5/51.2 wt %),
point E (R32/R125/R134a=31.7/14.9/53.4 wt %), and
point D (R32/R125/R134a=32.7/12.8/54.5 wt %).

2. The composition comprising a mixture containing fluorinated hydrocarbons according to claim 1, wherein the composition ratio of the fluorinated hydrocarbons contained in the mixture falls within a quadrilateral having the following four points as vertices in a ternary composition diagram in which the sum of the concentrations of R32, R125, and R134a is 100 wt %:
point B' (R32/R125/R134a=33.7/14.7/51.6 wt %),
point C (R32/R125/R134a=33.3/15.5/51.2 wt %),
point E (R32/R125/R134a=31.7/14.9/53.4 wt %), and
point D' (R32/R125/R134a=32.4/13.4/54.2 wt %).

3. The composition comprising a mixture containing fluorinated hydrocarbons according to claim 1, wherein the composition ratio of the fluorinated hydrocarbons contained in the mixture falls within a triangle having the following three points as vertices in a ternary composition diagram in which the sum of the concentrations of R32, R125, and R134a is 100 wt %:
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %); and
wherein the composition ratio falls within the following ranges: R32=32.5 wt %±0.5 wt %, R125=15.0 wt %±0.5 wt %, and R134a=52.5 wt %±1.0 wt %.

4. The composition according to claim 1, wherein the mixture further comprises at least one compound selected from the group consisting of HCFC-1122, HCFC-124, CFC-1113, and 3,3,3-trifluoropropyne.

5. The composition according to claim 1, wherein the mixture further comprises at least one halogenated organic compound represented by formula (1): $C_mH_nX_p$, wherein each X independently represents a fluorine atom, a chlorine atom, or a bromine atom, m is 1 or 2, $2m+2 \geq n+p$, and $p \geq 1$.

6. The composition according to claim 1, wherein the mixture further comprises at least one organic compound represented by formula (2): $C_mH_nX_p$, wherein each X independently represents an atom that is not a halogen atom, m is 1 or 2, $2m+2 \geq n+p$, and $p \geq 1$.

7. The composition according to claim 1, wherein the mixture further comprises water.

8. The composition according to claim 1, wherein the mixture consists of R32, R125, and R134a.

9. The composition according to claim 1, wherein the mixture has a GWP of 1500 or less, and the refrigerating capacity of the mixture is 94% or more relative to the refrigerating capacity of R404A.

10. The composition according to claim 1, comprising a refrigerant oil.

11. The composition according to claim 10, wherein the refrigerant oil comprises at least one polymer selected from the group consisting of polyalkylene glycol (PAG), polyol ester (POE), and polyvinyl ether (PVE).

12. The composition according to claim 1, comprising at least one substance selected from the group consisting of tracers, compatibilizers, ultraviolet fluorescent dyes, stabilizers, and polymerization inhibitors.

13. The composition according to claim 1, which is used for at least one member selected from the group consisting of refrigerators, freezers, water coolers, ice machines, refrigerating showcases, freezing showcases, freezing and refrigerating units, refrigerating devices for freezing and refrigerating warehouses, chillers (chilling units), turbo refrigerators, and screw refrigerators.

14. A refrigeration method comprising the step of operating a refrigeration cycle using the composition according to claim 1.

15. A method for operating a refrigerating device, comprising operating a refrigeration cycle using the composition according to claim 1.

16. A refrigerating device comprising the composition according to claim 1.

17. A method for producing a composition, comprising the step of mixing difluoromethane (R32), pentafluoroethane (R125), and 1,1,1,2-tetrafluoroethane (R134a) such that the composition ratio thereof is adjusted to fall within a triangle having the following three points as vertices in a ternary composition diagram in which the sum of the concentrations of R32, R125, and R134a is 100 wt %:
point A (R32/R125/R134a=37.3/17.0/45.7 wt %),
point F (R32/R125/R134a=30.7/10.9/58.4 wt %), and
point G (R32/R125/R134a=29.4/14.1/56.5 wt %), the mixture obtained in the step comprising R32, R125, and R134a in amounts such that the sum of the concentrations thereof is 99.5 wt % or more, and the mixture obtained in the step being an alternative refrigerant for R404A that is a mixed refrigerant.

* * * * *